(12) United States Patent
Hsu et al.

(10) Patent No.: US 12,744,452 B2
(45) Date of Patent: Sep. 22, 2026

(54) POWER CONVERTER COMPENSATION FOR GROUND BOUNCING

(71) Applicant: TEXAS INSTRUMENTS INCORPORATED, Dallas, TX (US)

(72) Inventors: Ting-Li Hsu, Munich (DE); Qiao Yang, Munich (DE); Stefan Herzer, Marzling (DE); Hans Schmeller, Freising (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 196 days.

(21) Appl. No.: 18/325,226

(22) Filed: May 30, 2023

(65) Prior Publication Data

US 2024/0405663 A1 Dec. 5, 2024

(51) Int. Cl.

*H02M 1/14* (2006.01)
*H02M 1/00* (2006.01)
*H02M 3/158* (2006.01)

(52) U.S. Cl.

CPC ........... *H02M 1/14* (2013.01); *H02M 1/0025* (2021.05); *H02M 3/158* (2013.01)

(58) Field of Classification Search

None

See application file for complete search history.

(56) References Cited

U.S. PATENT DOCUMENTS

| | | | | |
|---|---|---|---|---|
| 8,169,205 | B2 * | 5/2012 | Chen | H02M 3/156 323/282 |
| 8,421,432 | B2 * | 4/2013 | Hawkes | H02M 3/156 323/283 |
| 8,779,747 | B2 * | 7/2014 | Su | H02M 3/156 323/909 |
| 8,860,387 | B2 * | 10/2014 | Kobayashi | H02M 3/1582 323/288 |
| 9,219,415 | B2 * | 12/2015 | Sugiyama | H02M 3/158 |
| 9,280,164 | B2 * | 3/2016 | Lee | G05F 1/468 |
| 9,647,552 | B2 * | 5/2017 | Li | H02M 3/158 |
| 9,941,792 | B2 * | 4/2018 | Jing | H02M 3/156 |
| 10,205,395 | B2 * | 2/2019 | Zhang | H02M 3/33515 |
| 10,326,351 | B2 * | 6/2019 | Lo | H02M 3/156 |
| 10,439,494 | B2 * | 10/2019 | Sharifi | H02M 3/158 |
| 10,594,209 | B2 * | 3/2020 | Chen | H02M 3/158 |
| 10,797,598 | B1 * | 10/2020 | Malla | H02M 3/158 |
| 10,965,215 | B2 * | 3/2021 | Talari | H02M 1/15 |
| 11,784,568 | B2 * | 10/2023 | Priego | H02M 3/158 323/259 |
| 2007/0120547 | A1 * | 5/2007 | Tateishi | H02M 3/158 323/282 |

(Continued)

*Primary Examiner* — Thomas J. Hiltunen
(74) *Attorney, Agent, or Firm* — Zhenhai Fu; Frank D. Cimino

(57) ABSTRACT

An integrated circuit includes an error amplifier having a reference input, a feedback input, and an error output. A comparator has first and second comparator inputs and a comparator output. The first comparator input is coupled to the error output. A control circuit has a control input and a control output. The control input is coupled to the comparator output. The compensation circuit has a compensation control input and a compensation output. The compensation control input is coupled to the control output. The compensation output is coupled to at least one of the reference input, the feedback input, or the error output.

21 Claims, 9 Drawing Sheets

(56) References Cited

U.S. PATENT DOCUMENTS

2011/0234188 A1* 9/2011 Chiu ........................ H02M 1/14 323/282
2013/0099761 A1* 4/2013 Dong .................... H02M 3/156 323/288
2013/0249508 A1* 9/2013 Rahimi ................. H02M 3/156 323/271
2015/0180335 A1* 6/2015 Takada .................. H02M 3/156 323/288
2017/0346402 A1* 11/2017 Ishino ................. H02M 3/1588

* cited by examiner

POWER CONVERTER COMPENSATION FOR GROUND BOUNCING

BACKGROUND

A power converter, such a switch mode converter, can control an amount of power transmitted from a power source to a load as part of a power conversion operation. A switch mode power converter can switch between connecting the load to the power source, and connecting the load to a ground terminal, to set the amount of power transmitted to the load. The switch mode power converter may also receive a feedback signal representing a voltage across the load, and adjust the switching based on the feedback signal to regulate the voltage and power provided to the load. The switching of the power converter can inject current into the ground terminal, which can induce voltage ripples/pulses at the ground terminal and lead to a ground bouncing effect. The ground bouncing effect can introduce ripples/pulses in the feedback signal, which can introduce errors and instability in the power conversion operation.

SUMMARY

In one example, an integrated circuit includes an error amplifier having a reference input, a feedback input, and an error output. A comparator has first and second comparator inputs and a comparator output. The first comparator input is coupled to the error output. A control circuit has a control input and a control output, The control input is coupled to the comparator output. The compensation circuit has a compensation control input and a compensation output. The compensation control input is coupled to the control output. The compensation output is coupled to at least one of the reference input, the feedback input, or the error output.

In another example, a method for reducing the effects of ground bouncing includes determining an average of a current that flows through a low side transistor of a power converter when the low side transistor is enabled. The method further includes generating a pulse signal having an amplitude based on the average of the current and generating a compensated error signal based on a difference between a reference voltage and a feedback voltage of a power converter while combining the pulse signal with at least one of the reference voltage, the feedback voltage, or the difference. The method also includes enabling the low side transistor responsive to the compensated error signal exceeding a threshold (e.g., a peak current threshold in the case of peak current mode power converter).

DETAILED DESCRIPTION

Figure 1:
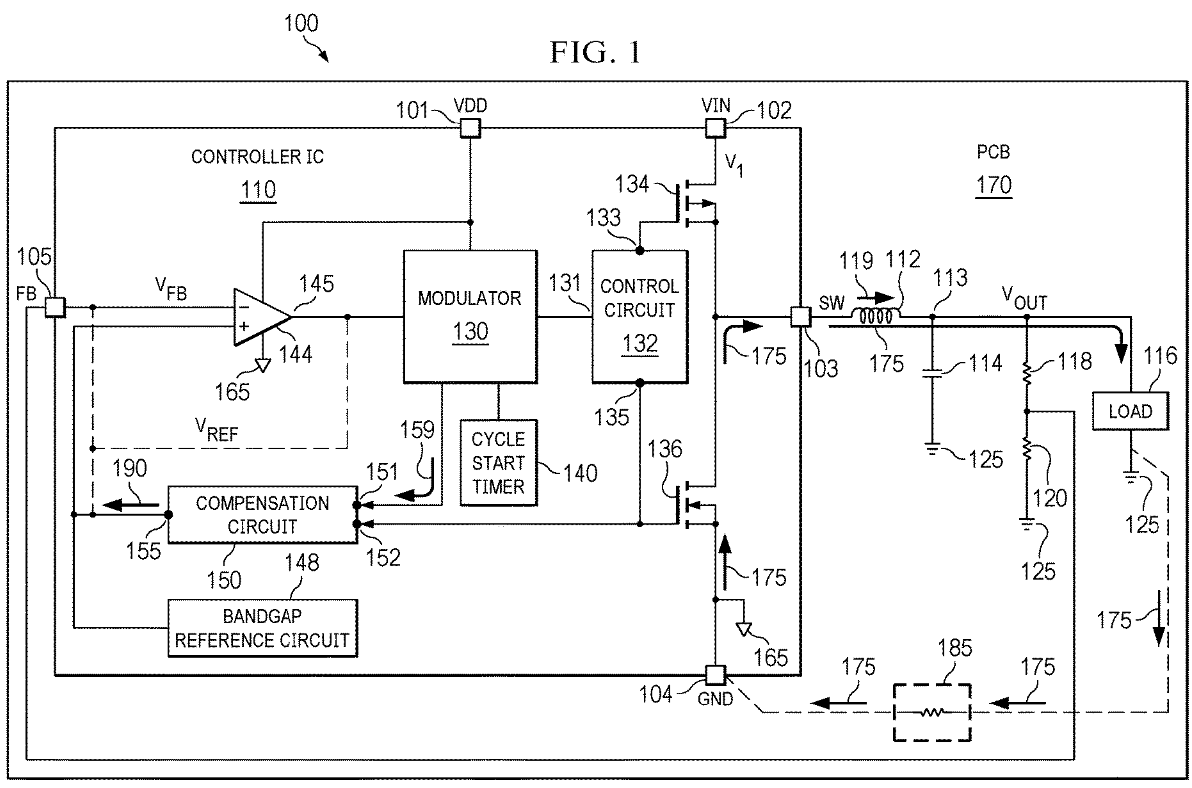
FIG. 1 is a schematic diagram of an example power converter which includes a compensation circuit to reduce the effects of ground bouncing.

The same reference numbers or other reference designators are used in the drawings to designate the same or similar (either by function and/or structure) features.

FIG. 1 is a schematic diagram of an example power converter 100 which includes a converter integrated circuit (IC) 110 and one or more components external to the converter IC 110. The external components can include an inductor 112, a capacitor 114, and a resistor divider including resistors 118 and 120. The power converter 100 example of FIG. 1 is a switch mode converter, such as a buck converter. In other examples, the power converter 100 can be a boost converter, a buck-boost converter, etc. The converter IC 100 can include multiple terminals including a power (VDD) terminal 101, an input voltage terminal 102, a switching (SW) terminal 103 a ground terminal 104, and a feedback (FB) terminal 105. Input voltage VIN can be coupled to the input voltage terminal 102, and the power converter 100 produces an output voltage ($V_{OUT}$) at a power output 113.

Inductor 112 is coupled between switching terminal 103 and power output 113. Current through inductor 112 is inductor current 119. Capacitor 114 is coupled between power output and a ground 125. Power output 113 can be coupled to a load 116. The output voltage $V_{OUT}$ from the power converter 100 can power load 116. In the example of FIG. 1, the resistor divider (resistors 118 and 120 coupled between power output 113 and the ground 125) has a feedback voltage output (connection between the resistors) coupled to the FB terminal 105 of IC 110. The negative input of error amplifier 144 can be coupled to the feedback terminal 105. Accordingly, the negative input of error amplifier 144 can also be referred to as the feedback input of the error amplifier 144.

Converter IC 110, inductor 112, capacitor 114, and resistors 118 and 120 can be mounted on a printed circuit board (PCB) 170. Ground 125 is a ground of the PCB 170. Load 116 can also be mounted on the PCB 170 or can be provided separate from, but coupled to, PCB 170.

Converter IC 110 can include a modulator 130, a control circuit 132, a high-side switch 134 (e.g., a transistor), a low-side switch 136 (e.g., a transistor), a cycle start timer 140, an error amplifier (EA) 144, a bandgap (BG) reference circuit 148, and a compensation circuit 150. Error amplifier 144 has an inverting (negative) input, a non-inverting (positive) input, and an error output. The output from bandgap reference circuit 148 is coupled to the positive input of error amplifier 144, where bandgap reference circuit 148 provides a reference voltage $V_{REF}$. Accordingly, the positive input of error amplifier 144 can also be referred to as the reference input of the error amplifier. The error output is coupled to an input of modulator 130, and an output of modulator 130 is coupled to a control input 131 of control circuit 132. An output from the cycle start timer 140 is coupled to the modulator. The cycle start timer 140 can generate a clock signal which initiates each switching cycle of the power converter.

Control circuit 132 has control outputs 133 and 135. Control output 133 is coupled to the control terminal (e.g., gate) of high-side switch 134, and control output 135 is coupled to the control terminal (e.g., gate) of the low-side switch 136. The high-side and low-side switches 134 and 136 are coupled in series between the input voltage terminal 102 and the IC's ground terminal 104. The source of high-side switch 134 is coupled to the drain of low-side switch 136 and to the SW terminal 103.

The converter's IC's internal ground is identified by reference numeral 165 in FIG. 1. The voltages within converter IC 110 (e.g., the voltage at the FB terminal 105) can be with reference to the converter IC's internal ground 165. Modulator 130 can implement a pulse width modulation (PWM) pulse signal which causes the high-side and low-side switches to be turned on and off in an alternating fashion (the high-side switch is on while the low-side switch is off, then the low-side switch is on while the high-side switch is off, and so on). Power converter 100 can also regulate the amount of power transmitted to the load 116 and the voltage across the load 116 in a feedback loop, in which modulator 130 can set the duty cycle of the PWM pulse signal, which sets the amounts of time the high-side switches and the low-side switches are turned on in each switching cycle, based on an error signal at the error output of error amplifier 144, and the error signal is based on a difference between the feedback voltage $V_{FB}$ and the reference voltage $V_{REF}$.

The switching of the high-side and the low-side switches can lead to voltage pulses/ripples at internal IC ground 165, which creates a ground bouncing effect. Specifically, when the low-side switch 136 is on, current 175 flows from the internal IC ground 165, through the low-side switch 136, through inductor 112 (as inductor current 119), to load 116, and back through a ground return path identified as a dashed line between the PCB ground 125 and the IC's internal ground 165. Parasitic 185 represents the resistance (and/or inductance) of the return ground path for current 175 between the PCB ground 125 and the IC's internal ground 165. Due to current 175 flowing through parasitic 185, a voltage is generated across the parasitic resistance 185 and between grounds 125 and 165, which creates the ground bouncing effect.

The ground bouncing effect can introduce ripples/pulses in the feedback signal, which can introduce errors and instability in the power conversion operation. Specifically, output voltage $V_{OUT}$ is with respect to ground 125. Feedback voltage $V_{FB}$ provided at the negative input of error amplifier 144 is derived from $V_{OUT}$ via the resistor divider of resistors 118 and 120, but as used by error amplifier 144, which is coupled to the converter IC's internal ground 165, is with reference to the converter IC's internal ground. Accordingly, each time the low-side switch 136 turns on, a voltage step occurs between the PCB's ground 125 and the converter IC's internal ground 165. The feedback voltage $V_{FB}$ is generated with respect to ground 125. On the other hand, the internally generated reference voltage $V_{REF}$ is with respect to internal IC ground 165. Accordingly, the ground bouncing can create a voltage pulse/ripple on error signal provided by error amplifier 144, which generates the error signal based on a difference between the feedback voltage $V_{FB}$ and the reference voltage $V_{REF}$. Viewed the other way, because of the ground bouncing and current 175 flowing from ground 125 to IC ground 165 as shown in FIG. 1, the feedback voltage $V_{FB}$ can have positive voltage pulses/ripples relative to the reference voltage $V_{REF}$. For brevity, the specification refers to the feedback voltage $V_{FB}$ having positive pulses/ripples due to the ground bouncing effect.

The ground bouncing can introduce errors and instability in the power conversion operation. Specifically, as described above, modulator 130 sets the duty cycle of the PWM pulse signal based on an error signal at the error output of error amplifier 144 to regulate the amount of power transmitted to the load 116 and the voltage across the load 116, and the error signal is based on a difference between the feedback voltage $V_{FB}$ and the reference voltage $V_{REF}$. The voltage pulses at the feedback voltage $V_{FB}$ introduces an error component, which can cause the feedback loop to converge at an incorrect output power or output voltage to load 116. Also, because the feedback voltage pulses toggle at the switching frequency, they can also affect the stability of the feedback loop.

Power converter 100 includes a compensation circuit 150 that can mitigate the effect of ground bouncing. Compensation circuit 150 has compensation control inputs 151 and 152 and a compensation output 155. Compensation control input 151 is coupled to modulator 130 and receives a signal 159 from modulator 130. Compensation control input 152 can be coupled to a control output (e.g., control output 135) of control circuit 132 to receive a signal indicative of a state of low-side switch 136. Compensation output 155 can be coupled to the positive/reference input of error amplifier 144, but as indicated by the dashed lines, can also be coupled to the negative/feedback input and/or the error output 145 of error amplifier 144. Compensation circuit 150 can produce a pulse signal 190 at its compensation output 155 responsive to the switching (turning on and turning off) of low-side switch 136. The amplitude of pulse signal 190 can be based on the amplitude of the error signal generated by error amplifier 144 at the error output 145, which can reflect the amount of current 175. The pulse signal 190 can have a similar amplitude and a similar switching frequency as the voltage pulse/ripples between grounds 125 and 165 caused by the ground bouncing phenomenon. Accordingly, the pulse signal 190 can be used to cancel out (or at lease attenuate) the error component in the difference between $V_{FB}$ and $V_{REF}$ caused by the voltage pulse/ripples between grounds 125 and 165, which can mitigate the effect of ground bouncing.

As described above, compensation circuit 150 can provide the pulse signal 190 at positive/reference input of error amplifier 144, at negative/feedback input of error amplifier 144, and/or at the output of error amplifier 144. In a case where the compensation output 155 of compensation circuit 150 is coupled to the positive/reference input of error amplifier 144 along with the reference voltage from the bandgap reference circuit 148, the pulse signal 190 generated by the compensation circuit 150 is added to the reference voltage. In this configuration, the pulse signal 190 from the compensation circuit 150 can have the same polarity as (e.g., in-phase with) the positive voltage pulse on the feedback voltage $V_{FB}$. Because the error amplifier 144 amplifies the difference between the reference voltage $V_{REF}$ and the feedback voltage $V_{FB}$, pulse signal 190 can cancel out the voltage pulse of the feedback voltage, and the ground bouncing effect on the error signal provided by error amplifier 144 can be mitigated or removed.

Also, in a case where the compensation output 155 of compensation circuit 150 is coupled to the negative/feedback input of the error amplifier 144, the pulse signal 190 generated by the compensation circuit 150 can have the opposite polarity as the voltage pulse in the feedback voltage $V_{FB}$, which can cancel out (or at least mitigate) the effect of ground bouncing.

Further, in a case where the compensation output 155 is coupled to the error output 145, pulse signal can also have the same or opposite polarity as the positive voltage pulse on the feedback voltage $V_{FB}$, if $V_{REF}$ is provided to the positive input of error amplifier 144 and $V_{FB}$ is provided to the negative input of error amplifier 144. In a case where $V_{REF}$ is provided to the negative input of error amplifier 144 and $V_{FB}$ is provided to the positive input of error amplifier 144, the pulse signal 190 generated by the compensation circuit 150 can have the opposite polarity as the voltage pulse in the feedback voltage $V_{FB}$.

Compensation circuit 150 can mitigate the effect of ground bouncing for various kinds of power converters, including power converters operating in current mode control and in voltage mode control. For a current mode converter, modulator 130 adjusts the duty cycle of the switching of the high-side and low-side switches 136 and 138 to adjust the magnitude of the inductor current 119 based on the amplitude of the error signal from error amplifier 144. Accordingly, the amplitude of the error signal indicates the magnitude of the inductor current, and the magnitude of the voltage step between grounds 125 and 165 when the low-side switch is on is proportional to the magnitude of the inductor current. In one example, the compensation circuit 150 uses the error signal from error amplifier 144 as an estimate for average inductor current through the low-side switch 136 (when the low-side switch 136 turns on) to generate the pulse signal.

Figure 2:
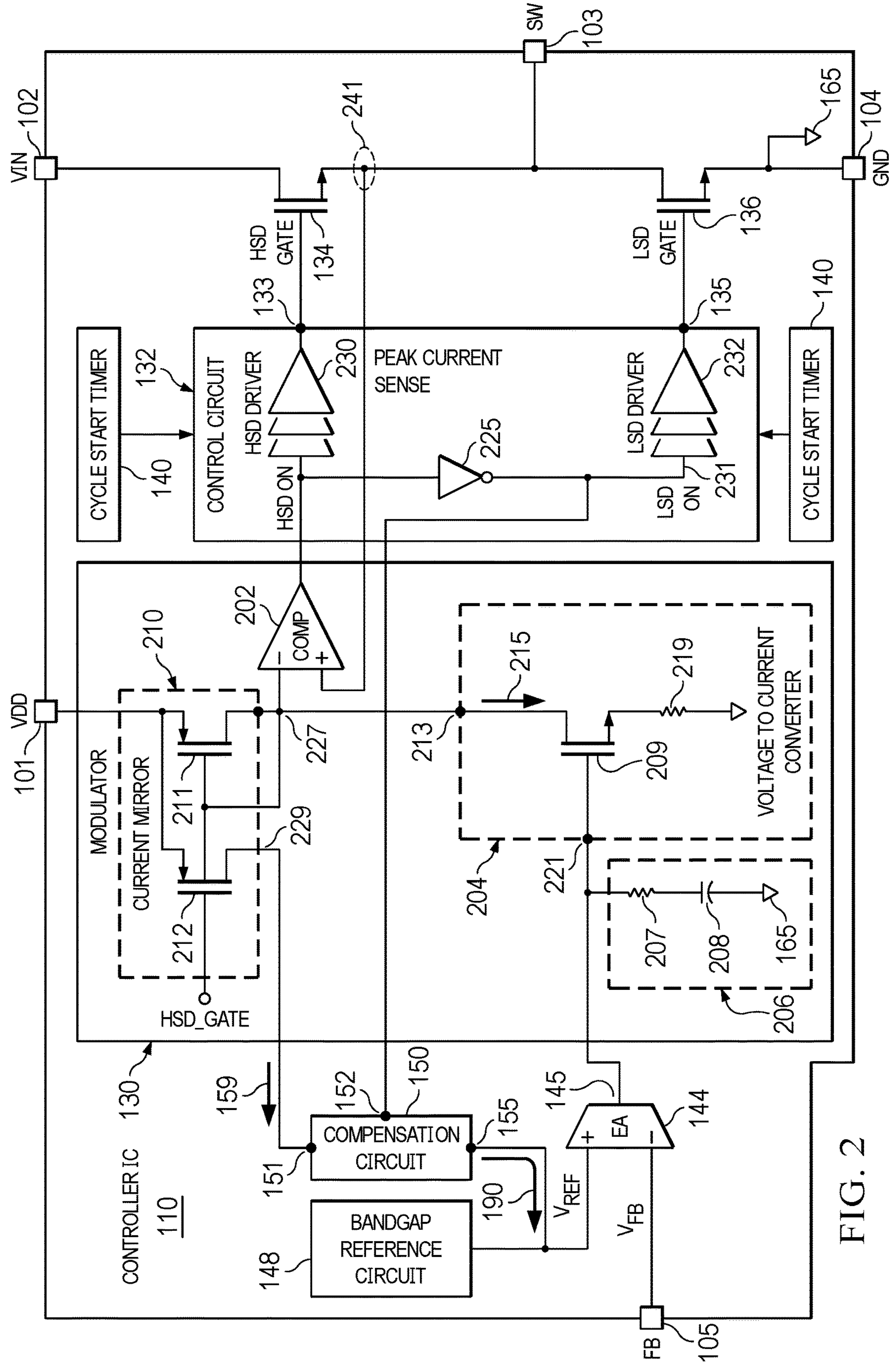
FIG. 2 is a schematic diagram of an example power converter having the compensation circuit of FIG. 1.

FIG. 2 is a circuit schematic of the controller IC 110 including compensation circuit 150 where modulator 130 can implement current mode control. In this example, modulator 130 can include a comparator 202, a voltage-to-current (V2I) converter 204, a proportional integral (PI) controller 206, and a current mirror 210. The current mirror 210 has a current mirror input 227 and a current mirror output 229. The V2I converter 204 has a converter input 221 and a converter output 213. The converter input 221 is coupled to the error output 145 of error amplifier 144. The converter output 213 is coupled to the current mirror input 227. The PI controller 206 is coupled between the error output 145 and the converter IC's ground 165. Comparator 202 has negative and positive inputs. The negative input is coupled to the current mirror input 217 and the converter output 213. The positive input is coupled to a current sense circuit 241 coupled between the source of the high-side switch 134 and the SW terminal 103.

Control circuit 132 includes gate drivers 230 and 232 and an inverter 225. The output of comparator 202 is coupled to gate driver 230 and, through inverter 225, is coupled to gate driver 232. The output of gate driver 230 is coupled to the control output 133 and to the gate of the high-side switch 134 and produces a control signal HSD_GATE to the gate of the high-side switch. The output of gate driver 232 is coupled to the control output 135 and to the gate of the low-side switch 136 and produces a control signal LSD_GATE to the gate of the low-side switch.

V2I converter 204 can include a transistor 209 and a resistor 219. In this example, transistor 209 is an n-channel field effect transistor (NFET). Resistor 219 is coupled between the source of transistor 209 and ground 165. PI controller 206 can include a resistor 207 coupled in series with a capacitor 208 between the error output 145 and ground 165.

Current mirror 210 can include transistors 211 and 212. In this example, both transistors 211 and 212 are p-channel field effect transistors (PFETs). Transistor 211 is a diode-connected transistor in which its gate is coupled to its drain. The gates of transistors 211 and 212 are coupled together as are their sources. The drain of transistor 211 is coupled to the current mirror input 217, and the drain of transistor 212 is coupled to the current mirror output 229. In one example, the size (ratio of channel width (W) to channel length (L) of transistor 212 is smaller than the size of transistor 211. Accordingly, current 215 through transistor 211 is mirrored as a current (signal 159) through transistor 212 but at a lower amplitude proportional to the relative size differences of the two transistors.

In this example, current 215 is a relatively constant current that is proportional to the peak inductor current 119. Error amplifier 144 produces a current at its error output 145 that flows into the PI controller 206 to produce an error voltage to the converter input 221. The magnitude of the error voltage is proportional to the difference between the $V_{FB}$ and $V_{REF}$ voltages. In the example of FIG. 2, the power converter is a peak mode current converter in which the modulator 130 adjusts, for example, the duty cycle of high-side and low-side switches 134 and 136 based on the peak inductor current. Comparator 202 compares the amplitudes of sensed current from current sense circuit 241 and current 215. When the high-side switch 134 is on, the inductor 119 current rises. Comparator 202 detects when the inductor current 119 reaches the level (referred to as a threshold herein) of current 215 and switches its output signal from high to low thereby causing the control circuit 132 to turn off the high-side switch and, after a short dead-time, turn on the low-side switch. With the low-side switch 136 on, the inductor current 119 decreases. A new switching cycle is initiated by cycle start timer 140 to again to turn off the low-side switch 136 and, after a short dead-time, turn on the high-side switch 134, and the process repeats.

As described above, current 215 is proportional to the peak of the inductor current. Current 215 is also proportional to the average of the inductor current, where a larger average load current is commensurate with a larger peak inductor current, and a smaller average load current is commensurate with a smaller peak inductor current. Accordingly, the amplitude of current 215 through transistors 211 and the V2I converter 204 can be proportional to the average inductor current conducted by low-side switch 163 in a switching cycle. Accordingly, compensation circuit 150 can generate pulse signal 190 based on current 159 (which reflects current 215) so that the amplitude of pulse signal 190 can match (or at least track) the voltage pulses at ground 165 due to the ground bouncing caused by the conduction of current through low-side switch 136.

Accordingly, current 215 is mirrored through current mirror 210 as signal 159 to the compensation circuit 150. The compensation circuit 150 generates a pulse signal whose amplitude is proportional to the amplitude of signal 159, that is proportional to the magnitude of current 215, which in turn can be proportional to the average inductor current. In the example of FIG. 2, the pulse signal generated by the compensation circuit 150 is added to the reference voltage from the bandgap reference circuit 148 and the summed signal (reference voltage from bandgap reference circuit plus pulse signal from compensation circuit) is provided to the positive/reference input of error amplifier 144. As described above, in some examples, the pulse signal from the compensation circuit 150 can also be combined with (e.g., subtracted from) the feedback voltage $V_{FB}$ from the feedback terminal 105, and/or with the error signal at the error output 145.

Figure 3:
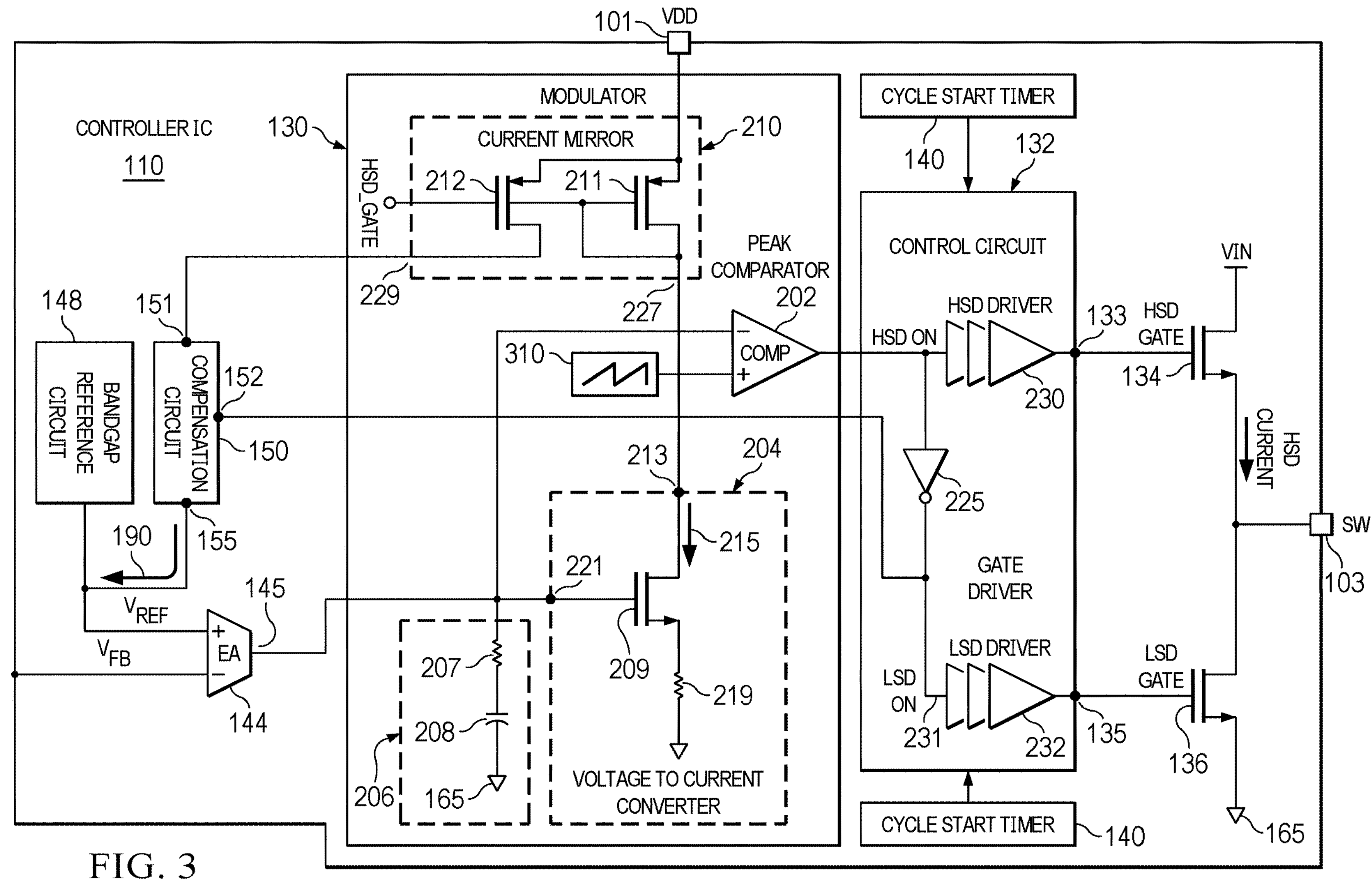
FIG. 3 is a schematic diagram of an example power converter having the compensation circuit of FIG. 1.

FIG. 3 is a circuit schematic of the controller IC 110 including compensation circuit 150, where modulator 130 can implement voltage mode control. In FIG. 3, modulator 130 can include a sawtooth signal generator 310 coupled to the positive input of comparator 202, and the negative input of comparator 202 is coupled to the error output 145 of error amplifier 144. Comparator 202 compares the error voltage at the error output 145 to a sawtooth signal produced by sawtooth signal generator 310 to generate the controlling PWM pulse to the gate drivers 230 and 232.

Figure 4:
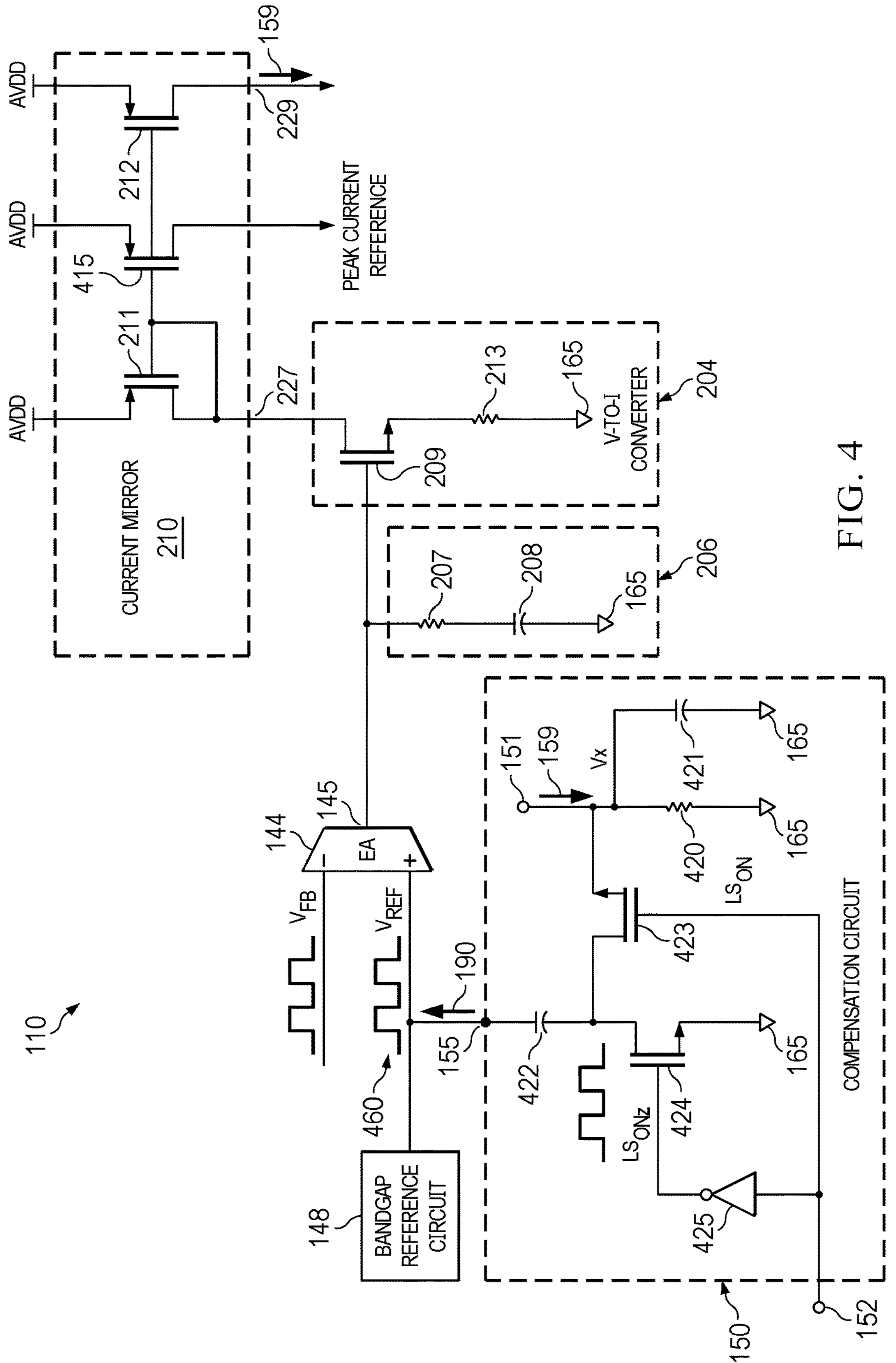
FIG. 4 is a schematic diagram of example circuits to support ground bouncing compensation.

FIG. 4 a schematic diagram illustrating examples of internal components of compensation circuit 150 and current mirror 210. In this example, current mirror 210 includes transistors 415 (e.g., PFET) and 212 coupled to transistor 211 to form the current mirror. The mirrored current through transistor 415 is the current 215 described above regarding FIGS. 2 and 3.

In this example, compensation circuit 150 can include a resistor 420, capacitors 421 and 422, switches (e.g., transistors) 423 and 424, and an inverter 425. Resistor 420 is coupled between the compensation control input 151 and the internal IC ground 165. Capacitor 421 is coupled in parallel with resistor 420. The upper terminal of capacitor 422 is coupled to the compensation output 155, which can be coupled to positive/reference input of error amplifier 144. Switch 424 can be coupled between the lower terminal of capacitor 422 and the internal IC ground 165. Switch 423 is coupled between the lower terminal of capacitor 422 and resistor 420, capacitor 421 and the compensation control input 151. The control input of switch 423 (e.g., the transistor's gate) is coupled to the compensation control input 152. The control input of switch 424 also can be coupled to the compensation control input 152, albeit through inverter 425. When the logic state of the control signal at the compensation control input 152 is at a first state (e.g., logic high), switch 423 is closed (enabled, on) and switch 424 is open (disabled, off), and when the logic state of the control signal at the compensation control input 152 is at a second state (e.g., logic low), switch 424 is closed (enabled, on) and switch 423 is open (disabled, off).

As described above, the magnitude of signal (e.g., current) 159 from the current mirror 210 is proportional to the inductor current 119. Signal 159 is a current which flows into resistor 420 resulting in a voltage Vx forming across resistor 420. As described above, because the voltage Vx is generated from signal 159, the voltage Vx can reflect the voltage pulses/ripples at internal ground 165 when the low-side switch 136 turns on. Capacitor 421 can be a filter to smooth out ripples in signal 159. The voltage that forms across resistor 420 is thus proportional to inductor current 119. When switch 424 is closed, the bottom terminal of capacitor 422 is coupled to ground. Capacitor 422 can store the $V_{REF}$ voltage between its top and bottom terminals.

When switch 424 opens and switch 423 closes (and the low-side switch 136 turns on/closes), the resistor's voltage Vx is coupled to the bottom terminal of capacitor 422. Because capacitor 421 stores the $V_{REF}$ voltage between its top and bottom terminals, the voltage at the top terminal (and the positive/reference input of error amplifier 144) becomes $V_{REF}$+Vx, which results in a voltage step. Also, when switch 424 closes and switch 423 opens (and the low-side switch 136 turns off/opens), the voltage at the top terminal returns back to $V_{REF}$. Accordingly, and as illustrated on the positive/reference input of error amplifier 144, a pulse signal 460 is generated, which is approximately in-phase with the positive voltage pulse on the feedback voltage $V_{FB}$ (e.g., both being positive pulses) due to ground bouncing caused by the low-side switch being turned on and off. Because amplifier 144 amplifies the difference between the reference voltage $V_{REF}$ and the feedback voltage $V_{FB}$, amplifier 144 generates an output error signal with very little, if any, voltage pulses due to ground bouncing.

Figure 5:
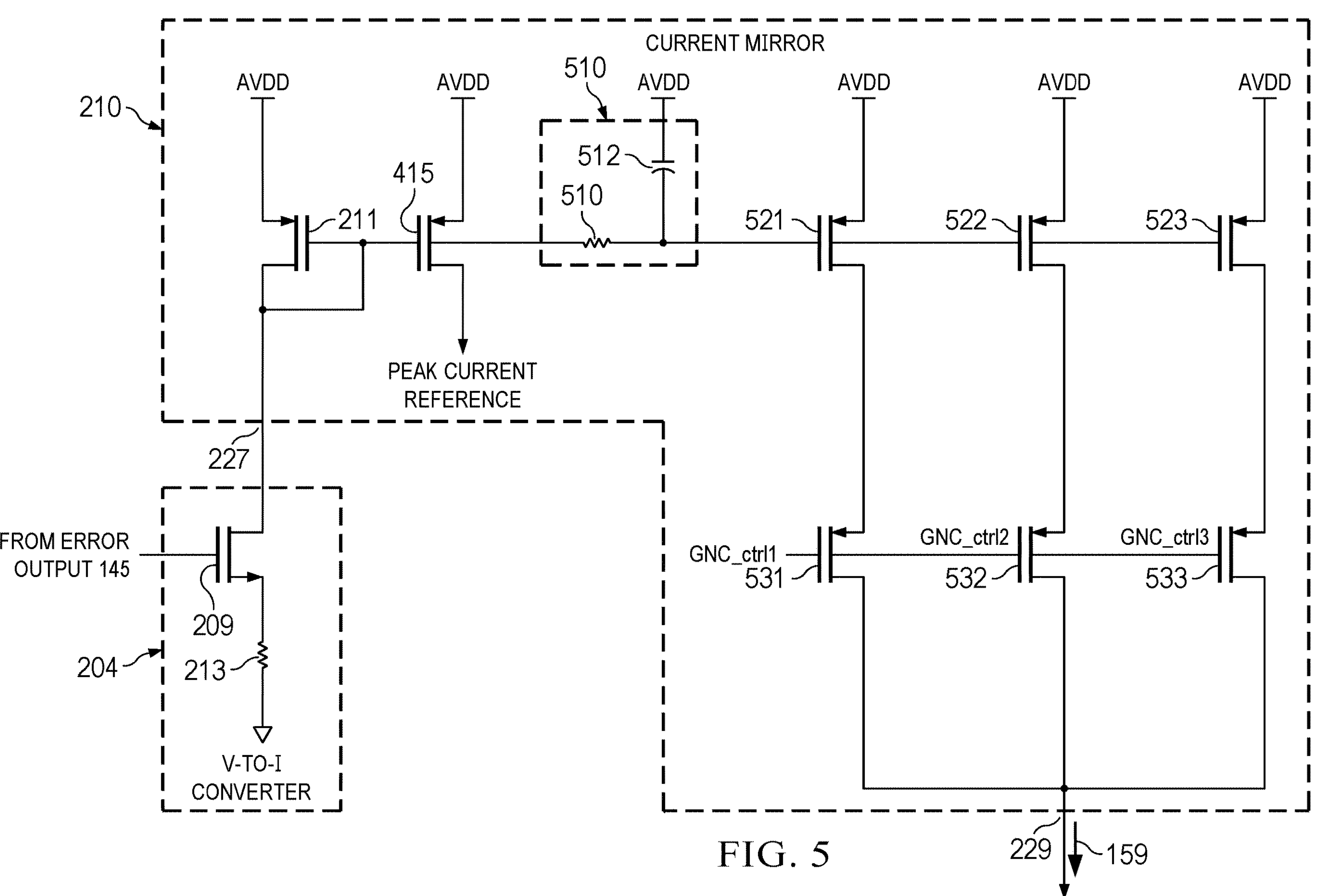
FIG. 5 is a schematic diagram of example circuits to support ground bouncing compensation.

FIG. 5 is a schematic diagram of an example implementation of current mirror 210 in which the current mirror has multiple, individually enabled current segments to generate signal 159. In this example, in addition to the diode-connected transistor 211 and transistor 415, current mirror 210 includes transistors 521, 522, 523, 531, 532, and 533. The control terminals of transistors 521-523 (e.g., PFETs) are coupled to diode-connected transistor 211. Transistors 531-533 are operated as switches. Each such switch is coupled between the drain of its respective transistor 521-523 and the current mirror output 229. Each transistor 531-533 can be individually enabled and disabled. One of the transistors 531-533, two of the transistors 531-532, or all three of the transistors 531-533 can be enabled to configure/tune the magnitude of the current of signal 159 output by the current mirror 210. The gate control signals GNC_ctrl1 541, GNC_ctrl2 542, and GNC_ctrl3 543 to the gates of transistors 531, 532, and 533, respectively, control the on/off state of those transistors. The gate controls signals 541-543 can be set at start-up of the controller IC 110 from, for example, a configuration register.

Figure 6:
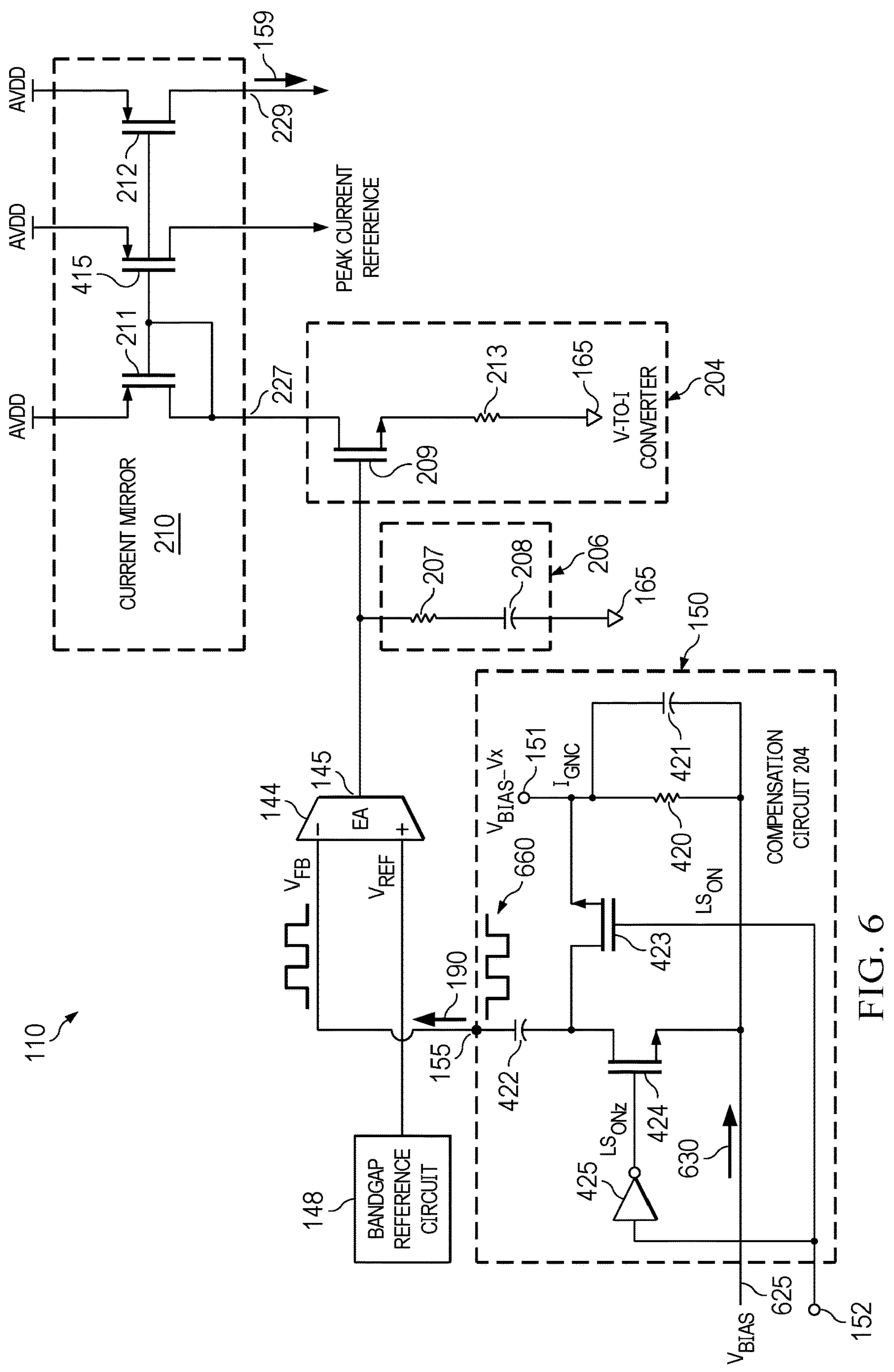
FIG. 6 is a schematic diagram of example circuits to support ground bouncing compensation.

FIG. 6 is a schematic diagram of controller IC 110 in which the compensation output 155 is coupled to the negative/feedback input of error amplifier 144. In FIG. 6, the resistor 420 and capacitor 421 are coupled in parallel between the compensation control input 152 and a voltage bias terminal 625, which can provide a voltage VBIAS. A current 630, which can be generated by mirroring the current of signal 159, can flow from the voltage bias terminal 625 towards compensation control input 151, and compensation control input 151 can have a voltage $V_{BIAS}$-VX. Also, transistor 425 is coupled between the bottom terminal of capacitor 422 and the voltage bias terminal 625. In this configuration, the compensation circuit 204 can generate a pulse signal 660 with the same amplitude as pulse signal 460 (FIG. 4) but with the opposite polarity. When switch 424 is closed and switch 423 is opened (when low-side switch 136 is opened), capacitor 422 can store a voltage equal to $V_{REF}$-$V_{BIAS}$ across the top and bottom terminals. When switch 424 is opened and switch 423 is closed (when low-side switch 136 is closed), the bottom terminal of capacitor 422 can be connected to the voltage $V_{BIAS}$-Vx, which causes the voltage at the top terminal of capacitor 422 to also drop by Vx. In this way, pulse signal 660 has the opposite polarity compared to the voltage pulse of the feedback voltage $V_{FB}$ (e.g., the feedback voltage has positive pulses, and pulse signal 660 has negative pulses), thereby reducing or eliminating the voltage pulses in the feedback voltage $V_{FB}$ caused by ground bounding. In another example, the compensation output 155 of the compensation circuit 150 can be coupled to the error output 145 of error amplifier 144, where compensation circuit 150 can introduce voltage pulses to compensate for/reduce the error in the output of error amplifier 144 caused by ground bouncing.

Figure 7:
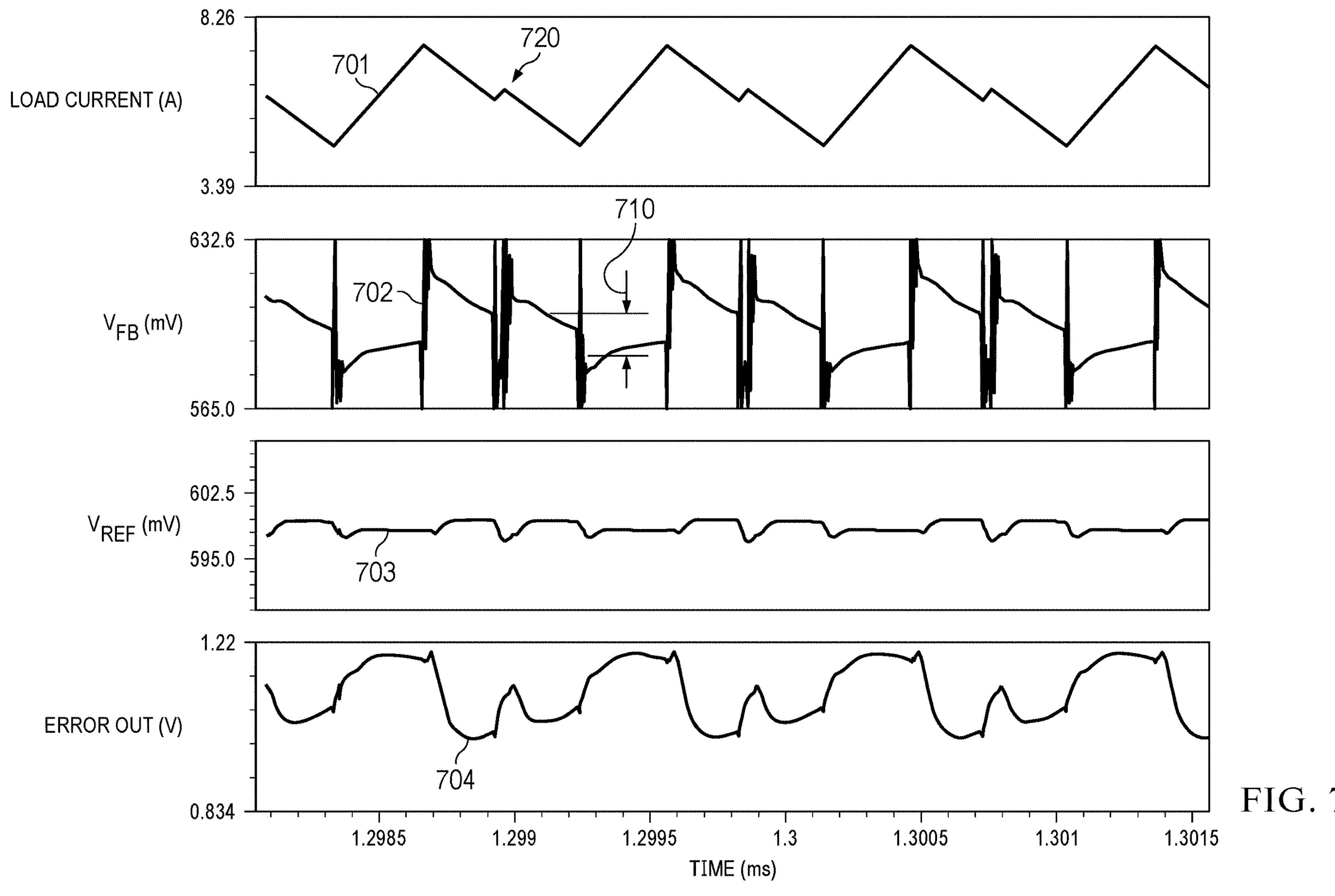
FIG. 7 includes graphs that illustrate operations of a power converter that does not include the compensation circuit described herein.

FIG. 7 includes graphs illustrating operations of a power converter that does not employ ground bounce compensation. The graphs illustrate inductor current 701, the feedback voltage $V_{FB}$ 702, the reference voltage 703, and the error amplifier's output voltage 704. The reference voltage $V_{REF}$ is relatively constant (approximately 600 mV) but the feedback voltage $V_{FB}$ has a substantial voltage step 710 superimposed on the output voltage from the bandgap reference circuit 148. The feedback voltage $V_{FB}$ introduces additional error components to the output of the error amplifier, which causes ripples 720 in the inductor current 701.

Figure 8:
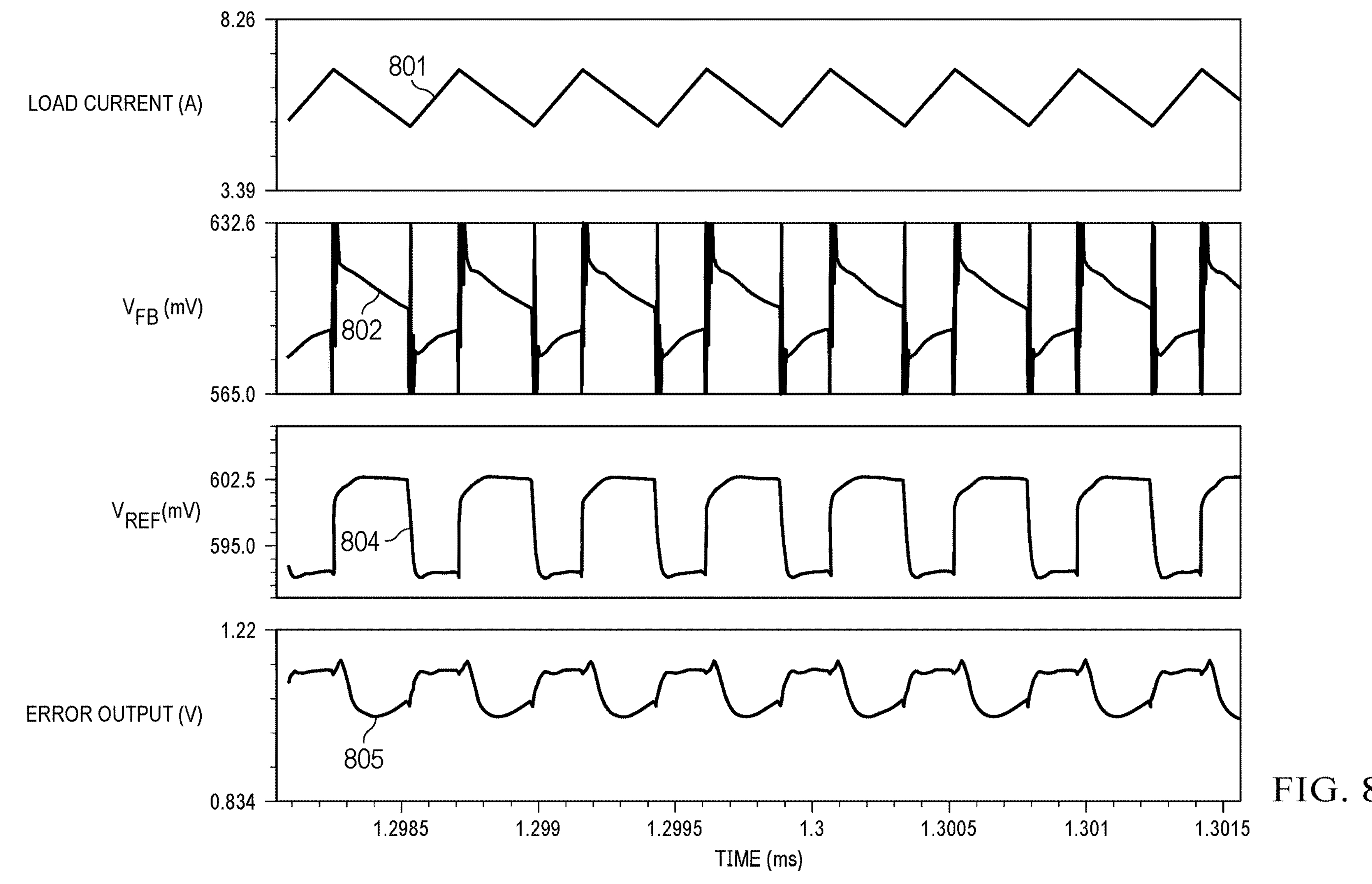
FIG. 8 includes graphs that illustrate operations of a power converter including the compensation circuit described herein.

FIG. 8 includes example waveforms for the same signals (inductor current 801, feedback voltage $V_{FB}$ 802, reference voltage 804, and error amplifier output voltage 805) but for the controller IC 110 that includes the compensation circuit 150 to reduce or eliminate the voltage step at the output 145 of error amplifier 144 due to ground bouncing. In this example, the pulse signal generated by the compensation circuit 150 is provided to the positive/reference input of error amplifier 144. Accordingly, the reference voltage input to the error amplifier also is a pulse signal that is in-phase with the step voltage on the feedback voltage $V_{FB}$. As described above, error amplifier 144 amplifies the difference between the feedback voltage and the reference voltage, and because both of those voltages in the example of FIG. 8 have a pulse signal shape that is in-phase with respect to each other, the magnitude of the voltage step is largely muted at the output 145 of error amplifier 144, the ripples in the inductor current shown in FIG. 7 are not present in FIG. 8.

Figure 9:
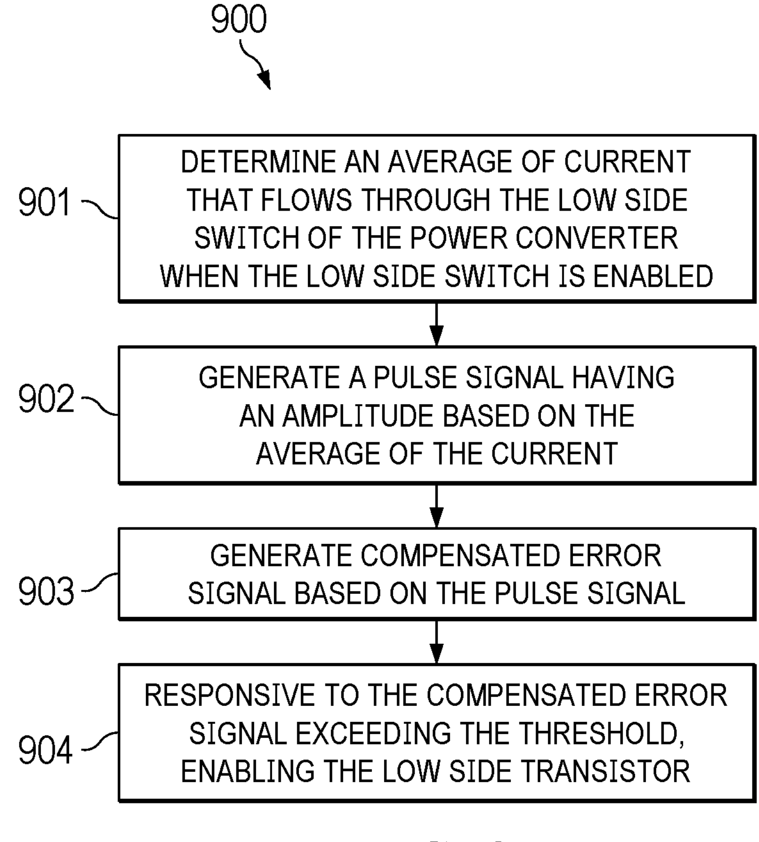
FIG. 9 is a flowchart illustrating an example method for reducing the effects of bouncing.

FIG. 9 is a flow chart illustrating an example method 900 for mitigating the effect of ground bouncing for a power converter. In operation 901, the method can include determining a current that flows through a low side transistor of a power converter when the low side transistor is enabled. The determination of the current can be based on the error signal generated by an error amplifier (e.g., error amplifier 144) by V2I converter 204.

In operation 902, a compensation circuit (e.g., by compensation circuit 150) can generate a pulse signal having an amplitude based on an average of the current. For example, compensation circuit 150 can generate a voltage across resistor 420 based on a current represented by signal 159 provided by mirroring the output of V2I converter 204.

In operation 903, the error amplifier (e.g., error amplifier 144) can generate a compensated error signal based on the pulse signal. Specifically, the error amplifier can generate the compensated error signal based on a difference between a reference voltage and a feedback voltage of a power converter, where the pulse signal is combined with at least one of the reference voltage (e.g., the input of error amplifier 144 to which the reference voltage is provided), the feedback voltage (e.g., the input of error amplifier 144 to which the feedback voltage is applied), or the difference (e.g., the error output 145 of the error amplifier 144).

In operation 904, a control circuit (e.g., control circuit 132) can enable the low side transistor responsive to the compensated error signal exceeding a threshold (e.g., a peak current threshold in the case of peak current mode power converter).

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Also, in this description, the recitation "based on" means "based at least in part on." Therefore, if X is based on Y, then X may be a function of Y and any number of other factors.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead with little or no change to the remaining circuitry. For example, a field effect transistor ("FET") (such as an n-channel FET (NFET) or a p-channel FET (PFET)), a bipolar junction transistor (BJT—e.g., NPN transistor or PNP transistor), an insulated gate bipolar transistor (IGBT), and/or a junction field effect transistor (JFET) may be used in place of or in conjunction with the devices described herein. The transistors may be depletion mode devices, drain-extended devices, enhancement mode devices, natural transistors or other types of device structure transistors. Furthermore, the devices may be implemented in/over a silicon substrate (Si), a silicon carbide substrate (SiC), a gallium nitride substrate (GaN) or a gallium arsenide substrate (GaAs).

References may be made in the claims to a transistor's control input and its current terminals. In the context of a FET, the control input is the gate, and the current terminals are the drain and source. In the context of a BJT, the control input is the base, and the current terminals are the collector and emitter.

References herein to a FET being "on" or "enabled" means that the conduction channel of the FET is present and drain current may flow through the FET. References herein to a FET being "off" or "disabled" means that the conduction channel is not present so drain current does not flow through the FET. An "off" FET, however, may have current flowing through the transistor's body-diode.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description.

In this description, unless otherwise stated, "about," "approximately" or "substantially" preceding a parameter means being within +/−10 percent of that parameter or, if the parameter is zero, a reasonable range of values around zero.

Modifications are possible in the described embodiments, and other embodiments are possible, within the scope of the claims.

What is claimed is:

1. An integrated circuit (IC) comprising:
- an error amplifier having a reference input, a feedback input, and an error output;
- a comparator having first and second comparator inputs and a comparator output, the first comparator input coupled to the error output;
- a control circuit having a control input and a control output, the control input coupled to the comparator output; and
- a compensation circuit having a first compensation control input, a second compensation control input, and a compensation output, the first compensation control input coupled to the control output, and the compensation output coupled to at least one of the reference input, the feedback input, or the error output, the compensation circuit configurable to;
  - receive a switching signal provided by the control circuit at the first compensation control input;
  - receive, at the second compensation control input, a control signal indicating an amplitude of an error signal at the error output; and
  - provide a pulse signal to the at least one of the reference input, the feedback input, or the error output responsive to the switching signal, the pulse signal having a timing determined based on the switching signal and having an amplitude determined based on the control signal.

2. The IC of claim 1, wherein the comparator is part of a modulator circuit, and the modulator circuit includes a conversion circuit coupled between the second compensation control input and the error output.

3. The IC of claim 1, further comprising a switch having a control terminal coupled to the control output, and a switch terminal coupled to ground, wherein the compensation circuit is configurable to provide the pulse signal at the at least one of the reference input, the feedback input, or the error output responsive to the switching signal to at least partially compensate ground bouncing associated with switching the switch by the switching signal.

4. The IC of claim 1, wherein the compensation circuit has a bias terminal and includes:
- a capacitor having first and second capacitor terminals, the first capacitor terminal coupled to the compensation output;
- a first switch coupled between the second capacitor terminal and the bias terminal, the first switch having a first switch control terminal coupled to the first compensation control input; and
- a second switch coupled between the second capacitor terminal and the second compensation control input, the second switch having a second switch control terminal coupled to the first compensation control input.

5. The IC of claim 4, wherein the bias terminal is coupled to a ground terminal or a voltage source circuit.

6. The IC of claim 4, wherein the capacitor is a first capacitor, and the compensation circuit includes a resistor and a second capacitor coupled between the second compensation control input and the bias terminal.

7. The IC of claim 6, further comprising:
- a voltage-to-current converter circuit having a converter input and a converter output, the converter input coupled to the error output; and
- a current mirror having a current mirror input and a current mirror output, the current mirror input coupled to the converter output, and the current mirror output coupled to the resistor and the second capacitor.

8. The IC of claim 7, wherein the current mirror includes a diode-connected transistor coupled to the converter output, the diode-connected transistor having a control terminal,
- wherein the control terminal of the diode-connected transistor is coupled to the first comparator input, and the second comparator input is coupled to a current sense terminal.

9. The IC of claim 1, further comprising a sawtooth signal generator having an output coupled to the second comparator input.

10. A system comprising:
- an integrated circuit (IC) having a first ground terminal, an input voltage terminal, a switching terminal, and a feedback terminal, and the IC including:
  - a high side transistor coupled between the input voltage terminal and the switching terminal, the high side transistor having a first transistor control terminal;
  - a low side transistor coupled between the switching terminal and the first ground terminal, the low side transistor having a second transistor control terminal;
  - an error amplifier having a first input, a second input coupled to the feedback terminal, and an error output;
  - a comparator having first and second comparator inputs and a comparator output, the first comparator input coupled to the error output;
  - a control circuit having a control input and a control output, the control input coupled to the comparator output; and a compensation circuit having a first compensation control input, a second compensation control input, and a compensation output, the first compensation control input coupled to the control output, and the compensation output coupled to at least one of the first input, the second input, or the error output, the compensation circuit configurable to;

receive switching signals provided by the control circuit at the first compensation control input;

receive, at the second compensation control input, a control signal indicating an amplitude of an error signal at the error output; and provide a pulse signal to the at least one of the first input, the second input, or the error output responsive to the switching signal, the pulse signal having a timing determined based on the switching signals and having an amplitude determined based on the control signal;

an inductor coupled between the switching terminal and a power output; and a feedback resistor network coupled between the power output and a second ground terminal, the feedback resistor network having a feedback output coupled to the feedback terminal.

11. The system of claim 10, wherein the comparator is part of a modulator circuit, and the modulator circuit includes a conversion circuit coupled between the second compensation control input and the error output.

12. The system of claim 10, wherein the compensation circuit is configurable to provide the pulse signal at the at least one of the first input, the second input, or the error output responsive to the switching signal, to at least partially compensate voltage ripples at the first ground terminal and associated with switching the low side transistor by the switching signals.

13. The system of claim 10, wherein the compensation circuit has a bias terminal and includes:

a capacitor having first and second capacitor terminals, the first capacitor terminal coupled to the compensation output;

a first switch coupled between the second capacitor terminal and the bias terminal, the first switch having a first switch control terminal coupled to the first compensation control input; and a second switch coupled between the second capacitor terminal and the second compensation control input, the second switch having a second switch control terminal coupled to the first compensation control input.

14. The system of claim 13, wherein the bias terminal is coupled to a ground terminal or a voltage source circuit.

15. The system of claim 13, wherein the capacitor is a first capacitor, and the compensation circuit includes a resistor and a second capacitor coupled between the second compensation control input and the bias terminal.

16. The system of claim 10, further comprising:

a voltage-to-current converter circuit having a converter input and a converter output, the converter input coupled to the error output; and a current mirror having a current mirror input and a current mirror output, the current mirror input coupled to the converter output, and the current mirror output coupled to the second compensation control input.

17. The system of claim 16, wherein the current mirror comprises a diode-connected transistor coupled to the converter output, the diode-connected transistor having a control terminal, wherein the control terminal of the diode-connected transistor is coupled to the first comparator input, and the second comparator input is coupled to a current sense terminal.

18. The system of claim 10, further comprising a sawtooth signal generator having an output coupled to the second comparator input.

19. A method comprising:

receiving a switching control signal of a transistor;

generating a pulse signal responsive to receiving the switching control signal, wherein the pulse signal has an amplitude determined based on an amplitude of pulses at a ground terminal coupled to the transistor;

generating an error signal responsive to the pulse signal; and responsive to the error signal exceeding a threshold, enabling the transistor.

20. The method of claim 19, wherein generating the error signal comprises: combining the pulse signal with a reference voltage to generate a compensated reference voltage, and generating the error signal based on a difference between the compensated reference voltage and a feedback voltage from a power converter including the transistor.

21. The method of claim 19, further comprising determining the amplitude of the pulses at the ground terminal coupled to the transistor based on at least one of: a first current that flows through the transistor when the transistor is enabled, a second current that flows through an inductor coupled to the transistor, or a third current indicating an amplitude of the error signal.

* * * * *